(12) United States Patent
Franz

(10) Patent No.: US 11,138,179 B2
(45) Date of Patent: Oct. 5, 2021

(54) SYSTEMS AND METHODS FOR CREATING AND MANAGING DYNAMIC ELEMENTS

(71) Applicant: Atlassian Pty Ltd, Sydney (AU)

(72) Inventor: Daniel Franz, Sydney (AU)

(73) Assignee: ATLASSIAN PTY LTD., Sydney (AU)

( * ) Notice: Subject to any disclaimer, the term of this patent is extended or adjusted under 35 U.S.C. 154(b) by 142 days.

(21) Appl. No.: 16/108,044

(22) Filed: Aug. 21, 2018

(65) Prior Publication Data

US 2019/0303446 A1 Oct. 3, 2019

Related U.S. Application Data

(60) Provisional application No. 62/650,941, filed on Mar. 30, 2018.

(51) Int. Cl.
*G06F 16/00* (2019.01)
*G06F 16/23* (2019.01)
*G06F 9/451* (2018.01)
*G06F 16/21* (2019.01)
*G06F 40/166* (2020.01)
*G06F 40/242* (2020.01)

(52) U.S. Cl.
CPC .............. *G06F 16/23* (2019.01); *G06F 9/451* (2018.02); *G06F 16/21* (2019.01); *G06F 40/166* (2020.01); *G06F 40/242* (2020.01)

(58) Field of Classification Search
None
See application file for complete search history.

(56) References Cited

U.S. PATENT DOCUMENTS

| | | | |
|---|---|---|---|
| 7,480,910 B1 * | 1/2009 | Kuwamoto | G06F 40/166 718/102 |
| 7,856,472 B2 * | 12/2010 | Arav | G06Q 10/107 709/204 |
| 2002/0019810 A1 * | 2/2002 | Kumar | G06Q 40/00 705/42 |
| 2004/0109011 A1 * | 6/2004 | Peterson, Jr. | G06F 3/038 715/700 |
| 2010/0005008 A1 * | 1/2010 | Duncker | G06F 16/972 705/26.1 |

* cited by examiner

*Primary Examiner* — Anhtai V Tran
(74) *Attorney, Agent, or Firm* — Brownstein Hyatt Farber Schreck, LLP

(57) ABSTRACT

Embodiments of the present invention provide a system and method for inserting a dynamic element into electronic content using a client application. The dynamic element includes a key and a corresponding value, the key and the value of the dynamic element stored in a database of a dynamic element management system (DEMS). The method performed by the DEMS includes: receiving a dynamic element insertion request from the client application; identifying and forwarding one or more keys corresponding to one or more suggested dynamic elements to the client application for rendering the one or more keys on a user interface of a client device; receiving indication of selection of a key from the one or more keys; retrieving a value of the dynamic element corresponding to the selected key from the database; and communicating the value of the dynamic element to the client application for rendering in line with the electronic content.

23 Claims, 8 Drawing Sheets

SYSTEMS AND METHODS FOR CREATING AND MANAGING DYNAMIC ELEMENTS

BENEFIT CLAIM

This application claims the benefit under 35 U.S.C. § 119(e) of provisional application 62/650,941, filed Mar. 30, 2018, the entire contents of which are hereby incorporated by reference for all purposes as if fully set forth herein.

TECHNICAL FIELD

The present disclosure generally relates to improved computer-implemented systems and methods for automatically creating and/or managing dynamic elements in electronic content.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Organizations typically create and/or manage large quantities of electronic content. Creation and management of this electronic content can usually be cumbersome, time consuming, and burdensome on network bandwidth. Oftentimes users create content such as documents, posts, comments, blogs, etc. that include data that is accurate/current at the time the content is created, but that becomes outdated/inaccurate soon thereafter. For example, consider a post hosted on an organization's intranet that informs employees of the names and contact details of the organization's HR representatives or legal councilors. Over time the employees in these roles may change. Every time this happens, the organization has to update the post. It may be simple to update one post, but this problem is exacerbated when organizations have multiple documents/posts/blogs/website pages which reference one or more details that need to be updated.

In other cases, users may create content that references fluctuating/variable data—e.g., the build status for a software code, weekly employee schedules, the current weather, etc., or data that the user may not readily have at hand—e.g., last year's profits, the organization's annual Christmas party date, the office's mailing address, etc. Typically, in these cases, the user has to check the value of the corresponding data items, e.g., from a reliable source, before entering this value into their content. This fact checking exercise can often be frustrating and time consuming, and in some cases even in spite of the checking, the data can become outdated very quickly.

SUMMARY

The appended claims may serve as a summary of the invention.

DESCRIPTION OF EXAMPLE EMBODIMENTS

Figure 1:
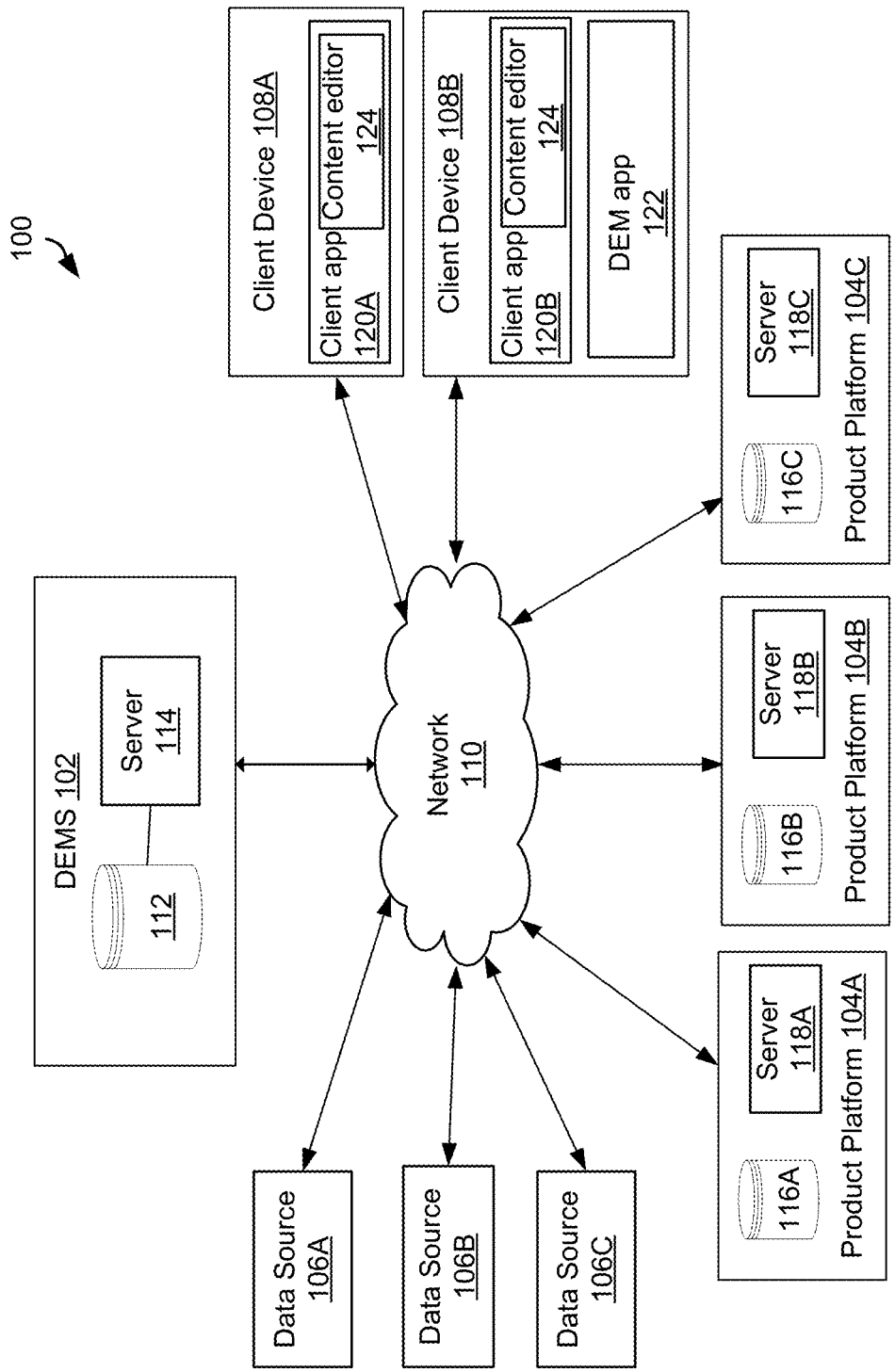
FIG. 1 is a block diagram of a networked environment according to some embodiments of the present disclosure.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention. Embodiments are described in sections according to the following outline:

1. OVERVIEW
2. EXAMPLE SYSTEM IMPLEMENTATION
3. EXAMPLE DATA STRUCTURE FOR DYNAMIC ELEMENTS
4. EXAMPLE FUNCTIONAL IMPLEMENTATION
   4.1 CREATING DYNAMIC ELEMENTS
   4.2 INSERTING A DYNAMIC ELEMENT IN CONTENT
   4.3 LOADING CONTENT WITH DYNAMIC ELEMENTS
   4.4 ASYNCHRONOUS REFRESHING
   4.5 DEM USER INTERFACE
   4.6 SUGGESTING DYNAMIC ELEMENTS
5. HARDWARE OVERVIEW

1. Overview

As described previously, organizations may create large amounts of content such as webpages, issues, conversations, etc. In many cases, this content can contain outdated data, which may be manually updated or if overlooked, remain outdated. In other cases, when creating content, users may wish to include data that they don't readily have access to or cannot remember.

To address one of more of these issues, embodiments of the present disclosure introduce dynamic elements that allow users to insert and/or edit data directly in their content.

Dynamic elements are elements that can be entered into electronic content by a user. Generally speaking, a dynamic element includes a key by which the element is identified and accessed and a corresponding value which is what ends up appearing in the electronic content. When a user wishes to add a dynamic element, they simply enter the key of the dynamic element directly into the context, e.g., via a content editor, and the current value associated with that key can be automatically inserted in the content in place of the key. Thereafter, whenever the underlying value of the dynamic element changes/is updated, the content automatically gets updated with the latest underlying value. This way, users can readily add data to their content without having to lookup values they can't remember and organizations can ensure that their content includes current values and not out of date or inaccurate data.

Importantly, once a dynamic element is created, it can be used by multiple users across multiple products (irrespective of which particular product a dynamic element is actually created in). For example, a dynamic element may be created by a user while adding content to a wiki page. That dynamic element can then be used by that or other users when performing other tasks on other products—e.g. when participating in a chat room on a messaging platform, when adding content to an issue in an issue tracking system etc.

Further, dynamic elements can be used to insert static data, such as the value of Pi, or the capital of Azerbaijan, or to insert dynamic data that may change/vary over time—such as stock prices, names of employees in certain roles, date of the company Christmas party and so on. Any changes in the value of the dynamic element in a central location can be carried over and automatically changed in every location that the dynamic element has been used.

These and other aspects of the present disclosure will be described in detail with reference to FIGS. 1-11 below.

2. Example System Implementation

FIG. 1 illustrates an environment 100 in which one or more aspects of the present disclosure are implemented. Specifically, FIG. 1 illustrates the systems involved in creating, maintaining and managing dynamic elements. The systems include a dynamic elements management system (DEMS) 102, product platforms, e.g., product platforms 104A, 104B and 104C, collectively referred to as product platforms 104, data sources, e.g., data sources 106A, 106B, and 106C, collectively referred to as data sources 106, and client devices, e.g., client devices 108A, 108B, and 108C, collectively referred to as client devices 108. The DEMS 102, product platforms 104, data sources 106, and client devices 108 communicate with each other over one or more communication networks 110.

The DEMS 102 is configured to create and manage dynamic elements. To that end, the DEMS 102 includes a management server 114 and a database 112. The server 114 is configured to primarily communicate with product platforms 104 and data sources 106. In particular, it is configured to communicate with the product platforms 104 to service requests for adding, creating, editing and refreshing dynamic elements and with the data sources to periodically poll these sources and retrieve values for dynamic elements. To a lesser extent, the DEMS 102 may also be configured to communicate directly with the client devices 108. This may be done when client devices 108 directly send service requested to the DEMS 102 for creating or editing dynamic elements. It may also be configured to service requests for browsing and managing dynamic elements.

The database 112 is configured to store dynamic element data which includes the key, value, and metadata associated with each dynamic element maintained by the DEMS 102. In certain embodiments, the DEMS 102 further includes a cache (not shown) for storing the current values of dynamic elements retrieved from data sources 106. Every time the value of a dynamic element is updated either by a user or automatically when data sources are polled, the corresponding values in the cache may be replaced, such that at any given time the cache only includes the most recent value for any given dynamic element.

In general, each product platform 104 is a system entity that hosts one or more software applications and/or content. Each platform 104 may include one or more servers, e.g., 118A, 118B and 118C, for hosting corresponding software application(s) and one or more storage devices, e.g., storage devices 116A, 116B and 116C, for storing application specific data. Examples of software applications hosted by product platforms 104 may include interactive chat applications, e.g., HipChat, Stride, collaborative applications, e.g., Confluence, software code management system, e.g., Bitbucket, and issue tracking applications, e.g., JIRA. Jira, Confluence, HipChat, BitBucket, and Stride are all offered by Atlassian, Inc. It will be appreciated that the software applications need not be offered by the same organization and that the presently disclosed invention can be used with any product platform configured to interact with the DEMS 102.

In order to run a particular application, the server 118 includes one or more application programs, libraries, APIs or other software elements that implement the features and functions of the application. In one example the product server 118 includes a content rendering module (not shown) which provides content rendering functionality as described in detail below.

The product platforms 104 also store product data. Product data generally includes: data defining the operation of the hosted application, for example, user accounts, user permissions, and the like; and application data, i.e., the content hosted/maintained by the application, which can be, for example, issue data (in Jira), page/document data (in Confluence), conversation and chatroom history (in HipChat and Stride), etc. The data is stored on and managed by database 116. Database 116 is provided by a database server which may be hosted by server 118, but is more typically hosted on a separate physical computer in communication directly or indirectly via one or more networks with the server 118.

While single server architecture has been described herein, it will be appreciated that one or more of the product platforms 104 can be implemented using alternative architectures. For example, in certain cases a clustered architecture may be used where multiple server computing instances or nodes are instantiated to meet system demand. Conversely, in the case of small enterprises with relatively simple requirements a product platform 104 may be a stand-alone implementation, i.e. a single computer directly accessed/used by the end user.

The data sources 106 host content and make this content available to one or more users on client devices 108. In the present disclosure, the DEMS 102 is configured to retrieve values for certain dynamic elements from the data sources. The data sources may be external data sources, i.e., hosted by third parties or internal sources, hosted by organizations that provide the product platforms, or organizations that use the product platforms. Examples of external data sources may include systems that host the latest weather data, stock prices, movie reviews, song lyrics, memes, etc. Examples of internal data sources may include employee databases, finance spreadsheets, team structure databases, etc.

The data sources 106 may be publicly accessible—i.e., the information available at the data sources 106 may be available for anybody to view. Alternatively, the data sources 106 may store at least some private/sensitive information that is restricted to certain individuals/teams, etc. In these cases, the data source may authenticate the management server 114 of the DEMS 102 each time it polls the data source to retrieve the value for a particular dynamic element.

Client devices 108 may be any device suitable for performing client-side operations described herein, for example a mobile device, e.g. a tablet or mobile phone, a portable device such as laptop computer, or any other computing device, e.g. a desktop computer.

Generally speaking, users of client devices 108 are associated with one or more user accounts and generate and/or communicate electronic content on one or more product platforms 104. This activity includes any type of user account interaction with the product platforms 104, including interaction with content and/or software applications hosted by the product platforms 104. Example interactions include accessing/viewing and/or contributing to one or more documents hosted by the product platforms, writing posts, commenting on content, visiting web pages, sharing, liking, or viewing content, communicating with user accounts in real-time chat interfaces, etc.

In order to allow users to perform these functions, as illustrated in FIG. 1, each client device 108 includes one or more client software applications, e.g., client applications 120A and 120B, that are configured to access software applications made available by product platforms 104. In some cases, the client devices 108 may include a client application corresponding to each product platform 104 the client device 108 has access to. In other cases, a single client application, e.g., a web browser, may be utilized to communicate with multiple product platforms.

The client applications 120 include instructions and data stored in the memory, e.g. non-transient compute readable media of the client devices 102 on which the applications are installed/run. These instructions are executed by a processor of the client device 102 to perform various functions as described herein. By way of example, some functions performed by the client applications 120 include communicating with applications hosted by the product platforms 106, rendering user interfaces based on instructions received from those applications, receiving inputs from user to interact with content hosted by product platforms 104.

In addition to client applications 120 that allow users to interact with product platforms 104, one or more of the client device 108 may further include a client application (see dynamic element management (DEM) application 122) configured to directly access the DEMS 102. In this case, the DEM application 122 may communicate with the DEMS 102 to render/update a user interface based on instructions received from the DEMS, and receive inputs from user accounts allowing users to interact with the DEMS 102.

The client applications 120 include content editors 124, i.e., interfaces for allowing users to create content, such as webpages, issues, conversations, posts, comments, etc. In some cases, content editors may use an iframe element for the content creation area, when a user clicks in the iframe, they can enter text, images or any other content in the iframe and once the user is done, they can submit the text so that the particular user interface currently displayed can be updated with the content submitted by the user. Any known content editor may be implemented without departing from the scope of the present disclosure.

The client applications 120 and 122 may be implemented in various ways. For example, the client applications may be web browser applications such as, for example, Chrome, Safari, Internet Explorer, Opera which access the applications hosted by the product platforms 106 and/or DEMS 102 via appropriate uniform resource locators (URL) and communicates with these systems via general world-wide-web protocols, e.g. HTTP, HTTPS, FTP. In this case the web browser application is configured to request, render and display user interfaces that conform to a markup language such as HTML, XML or extensions, and may be capable of internally executing browser-executable code such as JAVASCRIPT, or other forms of code. Alternatively, the client applications may be specific applications programmed to communicate with the product platforms 106 and/or DEMS 102 using defined application programming interface (API) calls.

As illustrated in FIG. 1, communications between the DEMS 102, client devices 108, product platforms 104, and data sources 106 are via the communications network 108. The communication network 110 is depicted as a single network in FIG. 1 for ease of depiction. However, in actual implementation, the various systems illustrated in FIG. 1 may communicate with each other over different communication networks. For example, the DEMS may communicate with the product platforms 104 and internal data sources through a local area network (LAN), whereas it may communicate with the client devices and external data sources via a public network, e.g., the Internet. Similarly, the product platforms 104 may communication with one or more client devices 108 via a LAN and with other client devices 108 via a public network without departing from the scope of the present disclosure. Furthermore, the DEMS 102, product platforms 104 and data sources 106 may communicate with each other over open web protocols such as HTTPS, REST, and JWT.

It will be appreciated that although only two client devices 108A and 108B, three product platforms 104A, 104B and 104C and three data sources 106A, 106B, and 106C have been depicted, in normal operation, many more client devices 108, data sources 106 and product platforms 104 may be connected to the identity platform through the network 110.

3. Example Data Structure for Dynamic Elements

This section describes data structures employed by the DEMS 102 to create and/or manage dynamic elements. The data structures and fields described are provided by way of example. Depending on the implementation, additional, fewer, or alternative fields may be used. Further, the fields described in respect of a given data structure may be stored in one or more alternative data structures, e.g. across multiple linked data structures. Further still, although tables are used to illustrate the data structures, the relevant fields/information may be stored in any appropriate format/structure.

As noted previously, users on their client devices 108 and through an associated user account may interact with content and/or applications hosted by one or more product platforms 104 using a corresponding client application. Similarly, users may interact with the DEMS via the DEM application 122 on the user's client device 108. Using any one of these avenues, a user operating through a user account provides information to create a dynamic element.

When sufficient information is received, the client application 120 or 122 generates a dynamic element descriptor for the DEMS 102. As described below, the client device 108 may automatically send this information to the DEMS 102. In case the client application 120 is utilized, the dynamic element descriptor is received from the corresponding product platform 104. Alternatively, if the DEM application 122 is utilized, the dynamic element descriptor is received directly from the client device 108. The DEMS 102 records relevant dynamic element information in the form of dynamic element records in one or more data structures. Each dynamic element record may store relevant information for a dynamic element.

For example, for a unique dynamic element record, the DEMS may store the following information:

- An ID to uniquely identify the dynamic element e.g., 38623.
- A key provided by the owner for the dynamic element e.g., ABC Stock price, Pi, Patent Attorney. This field is entered or selected by users when they wish to insert dynamic elements in content or when dynamic elements are recommended to users.
- Where the value of the dynamic element or a part thereof is locally stored: a value associated with the key. The value may be a value provided by the creator of the dynamic element, e.g., 3.1459 or John Dean, corresponding to the key.
- Where the value of the dynamic element or part thereof is accessed from a data source: source information pointing to a data source from where the value of the dynamic element can be retrieved. This may further include a source ID, a source name, an icon URL to extract an icon associated with the source, info URL to extract further information associated with the dynamic element, a data URL for extracting the value, a foreign key i.e., the unique ID the data source uses for the value, last updated indicated when the value was last retrieved from the source, a request body including the particular format of the request for retrieving the required information from that particular source, and authentication information in the case of private data sources to access the value. An example of this information may include
  name: NASDAQ,
  icon-url: http://www.nasdaq.com/favicon.png, info-url: http://www.nasdaq.com/market/TEAM    data-url: https://www.nasdaq.com/api/v1/get/TEAM
  foreign-key: TEAM last-updated: 2018 Mar. 16T05:35:01+00:00.
- A unit to identify where appropriate the unit of the value e.g., AU$, meters, watts, etc.
- A category identifier. In certain cases, dynamic elements can be classified into different categories. This may be done, for example, for similar types of dynamic elements, e.g., dynamic elements that receive data values from the same data source such as different stock prices from the Nasdaq website, or data elements created by a particular team. In certain embodiments, a category is created and/or selected at the time of creating a dynamic element. Alternatively, default categories based on teams, activities, or data sources may be created at a later stage either automatically or manually and one or more dynamic elements may be categorized under any of these categories. Using categories, dynamic element hierarchies may be created, allowing users to view dynamic elements nested within a particular category and drill down to a selected dynamic element.
- Permissions to specify who is allowed to view/edit/delete the dynamic element.
- Type to indicate whether the dynamic element is a static element, i.e., the value data is locally stored, or a dynamic element, i.e., at least some of the value data is accessed from a remote source.

The information associated with a particular record may be stored in various ways. For instance, the DEMS 102 may store the dynamic element data in multiple interconnected data structures (e.g., the source information for each data source may be stored in one data structure, and the authentication information for each data source may be stored in a different linked data structure.

In addition, the DEMS 102 may maintain other data structures to maintain records of the dynamic element requests it receives from client applications. This data may be used for example to identify the most recently used dynamic elements, the most popular dynamic elements for a particular user/team, the most popular dynamic elements in the organization, etc. It may also be used to identify dynamic elements that have not been used in some time.

Table A illustrates an excerpt from an example service request data structure maintained by the DEMS 102:

TABLE A

| service request data structure | | | | | |
|---|---|---|---|---|---|
| Record ID | User ID | PP ID | DE ID | Time dynamic element inserted | Team ID |
| ... | ... | ... | ... | ... | ... |
| 126378 | Jhksa8473 | Jk389 | 2837 | 21/03/2019 17:12:34 | 782 |
| 126379 | Uidy273 | Mb34 | 8280 | 21/03/2019 17:13:12 | 219 |
| 126380 | Jks2h893 | 87kh3 | 283 | 21/03/2019 17:13:48 | 823 |
| 126381 | Dhk29d | Dh34 | 92 | 21/03/2019 17:17:18 | 823 |
| ... | ... | ... | ... | ... | ... |

In the example record data structure, for each unique record, the following information is stored:

- An ID to uniquely identify the request.
- A user ID to identify the user account that generated the service request.
- A platform ID to identify the product platform associated with the user ID.
- A dynamic element ID that uniquely identifies the dynamic element for which the service request is made.
- A timestamp indicating the time a particular dynamic element is selected and inserted into content.
- A team ID indicating the team to which the user ID belongs.

The DEMS 102 also maintains a dictionary of keys that includes for example, the key names for the dynamic elements maintained by the DEMS 102 and their corresponding dynamic element ID. This dictionary may be utilized to identify one or more dynamic elements a user may be interested in as described with reference to FIG. 5.

In certain embodiments, the DEMS 102 also maintains a database of historic values for dynamic elements. This may be used, for example, to retrieve values of dynamic elements from specific times in the past, e.g., when the value of a dynamic element is frozen.

As noted, additional data structures and/or fields to those shown above may be used in implementing the embodiments described herein. For example, while value and source are depicted as the same field for static and dynamic elements, these could be two different fields. Further, dynamic elements of the static data types can be stored in one data structure whereas dynamic elements of the dynamic data type can be stored in another data structure without departing from the scope of the present disclosure. Further still, the dynamic element data structure may also store the user ID of the creator of the dynamic element.

4. Example Functional Implementation

This section describes various methods and processes for creating and managing dynamic elements. Generally speaking, the dynamic elements creation and management processes can be split into a number of smaller processes—a process for creating dynamic elements, a process for inserting dynamic elements in content, a process for rendering content with dynamic elements, and a process for refreshing dynamic elements. For descriptive purposes, each of these processes will be described independently. However, in some embodiments these processes can be joined, such that the output of one process is the input for another process.

4.1 Creating Dynamic Elements

Figure 3:
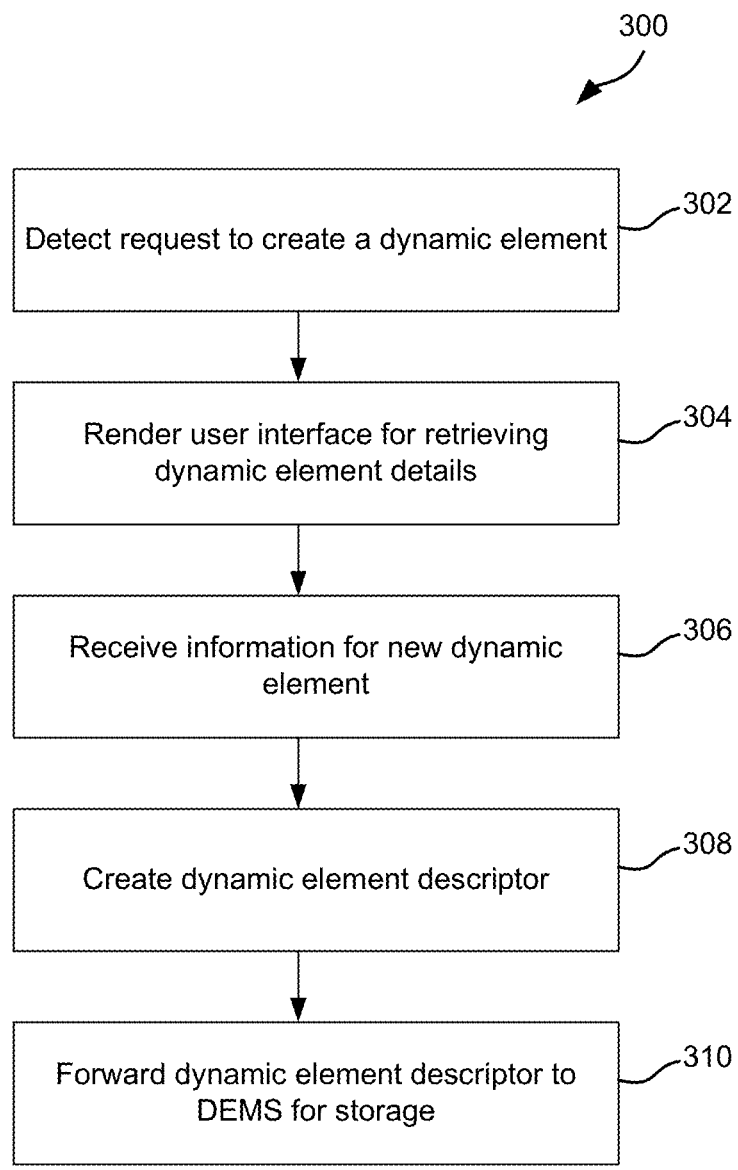
FIG. 3 is a flowchart illustrating a method for creating a dynamic element according to some embodiments of the present disclosure.

FIG. 3 illustrates an exemplary method 300 for creating dynamic elements. Although method 300 is described with reference to a single dynamic element, it will be appreciated that in practice this method can be repeated for creating other dynamic elements as well. Further, this method is described when a dynamic element is created using a client application such as application 120 that associated with a particular product platform, such as product platform 104A. A similar process can be followed when the dynamic element is created using a client-side application such as the DEM application 122 associated with the DEMS 102.

The method begins at step 302, where a request for creating a dynamic element is detected in the client application 120. This may happen in a number of different ways. In one example, a user may be in the middle of creating content via a content editor such as content editor 124 and may insert a special character, e.g., '=', or a sequence of special characters, e.g., '=+', in the content editor 124 to invoke the dynamic element creation process. In another example, the content editor 124 may include a graphical interactive element such as an icon or button, which may be activated to start the dynamic element creation process.

At step 304, the client application 120 renders a user interface for retrieving dynamic element details from the user. In some cases, the user interface may be in the form of a user form rendered over the currently displayed content. In other cases, for example, when the client device is a portable or mobile device, the client application 120 may direct the user to another page/webpage from the currently displayed content, which includes a user form to retrieve details.

Figures 4, 6:
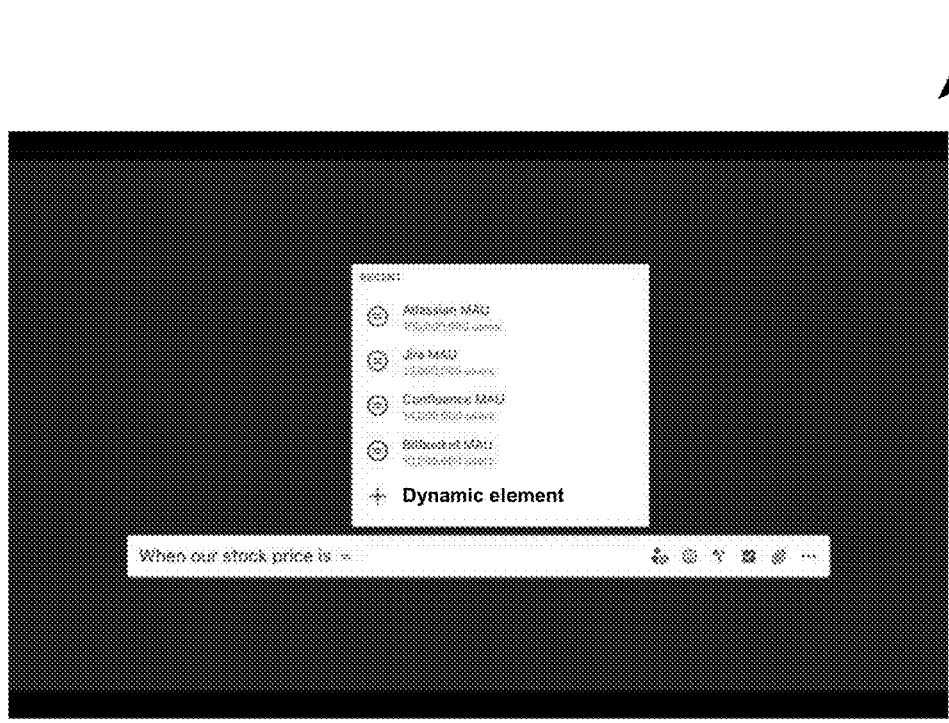
FIG. 4 illustrates a user interface for creating a dynamic element according to some embodiments of the present disclosure.
FIG. 6 illustrates a user interface depicting suggested dynamic elements according to some embodiments of the present disclosure.

At step 306, the client application 120 receives user input via the user interface. As a minimum to create a dynamic element, a key (name) and a value are required. FIG. 4 illustrates an example of a simple user form 400 for creating a new dynamic element. In this example, the form 400 includes the following fields: name (dynamic element key), value, and permissions. In other examples, the form can further include fields for specifying refresh rates for the dynamic element, for specifying the unit of the value, for specifying whether the value of the dynamic element is static or dynamic, and/or for specifying whether the dynamic element is part of a category.

The key can be any meaningful name that can be easily recollected or can provide some indication of what the dynamic element represents. As previously described, a value can be directly provided as illustrated in FIG. 4 or a pointer to a data source 106 from where the value can be retrieved may be offered. When a data source is selected, additional information such as an identifier for that particular data field in that particular data source, a format for requesting the value from the data source, and information for authenticating at the data source may also be provided via the user interface.

The permissions field can be used to indicate who can view/edit/delete the dynamic element. Permission can be set to global permissions so that anybody can engage with the dynamic element, organization level so that all employees can engage with the dynamic element, team level so that member of particular teams can engage with the dynamic element, or individual level so that only specific individuals can engage with the dynamic element. Further, in some embodiments, more refined permissions can be applied—for example, anybody in the organization may be allowed to view a particular dynamic element, but only members of a particular team can edit the dynamic element and only the creator can delete the dynamic element. Once the required information is entered, the user may indicate that they have completed the task, for example by selecting a 'save' or 'proceed' button.

The client application 120, at step 308, packages the information received via the user interface into a dynamic element descriptor. Table B below illustrates an example dynamic element descriptor. Although the descriptor is illustrated as a JSON file to illustrate information stored in the dynamic element descriptor, the relevant information need not be stored in a JSON file and could be stored in any appropriate format, e.g. a simple text file, an XML file, or a table.

TABLE B example dynamic element descriptor

- key: TEAM: stock price
- unit: USD
- category: 999
- permissions:
  - access: limited
  - users: { }
  - groups: { }
  - roles: { }
- type: dynamic
- source:
  - ID: 27ndkf48957
  - name: NASDAQ
  - icon-url: https:/www.nasdaq.com/favicon.png
  - info-url: https://www.nasdaq.com/market/TEAM
  - data-url: https://www.nasdaq.com/api/v1/get/TEAM
  - foreign-key: TEAM
  - last-updated: 2018-03-16T05:35:01+00:00
  - request body
    {
    ...
    }
- options
  - poll:
    - refresh: true
    - interval: 300000

At step 310 the client application1 120 forwards the dynamic element descriptor to the DEMS 102. In the present method, this can be done by forwarding the descriptor to the product platform 104A, which in turn forwards the dynamic element descriptor to the DEMS 102.

Subsequently, the DEMS 102 receives the dynamic element descriptor and unpacks the information in the descriptor to create a new record in its dynamic element data structure(s).

4.2 Inserting a Dynamic Element in Content

Figure 5:
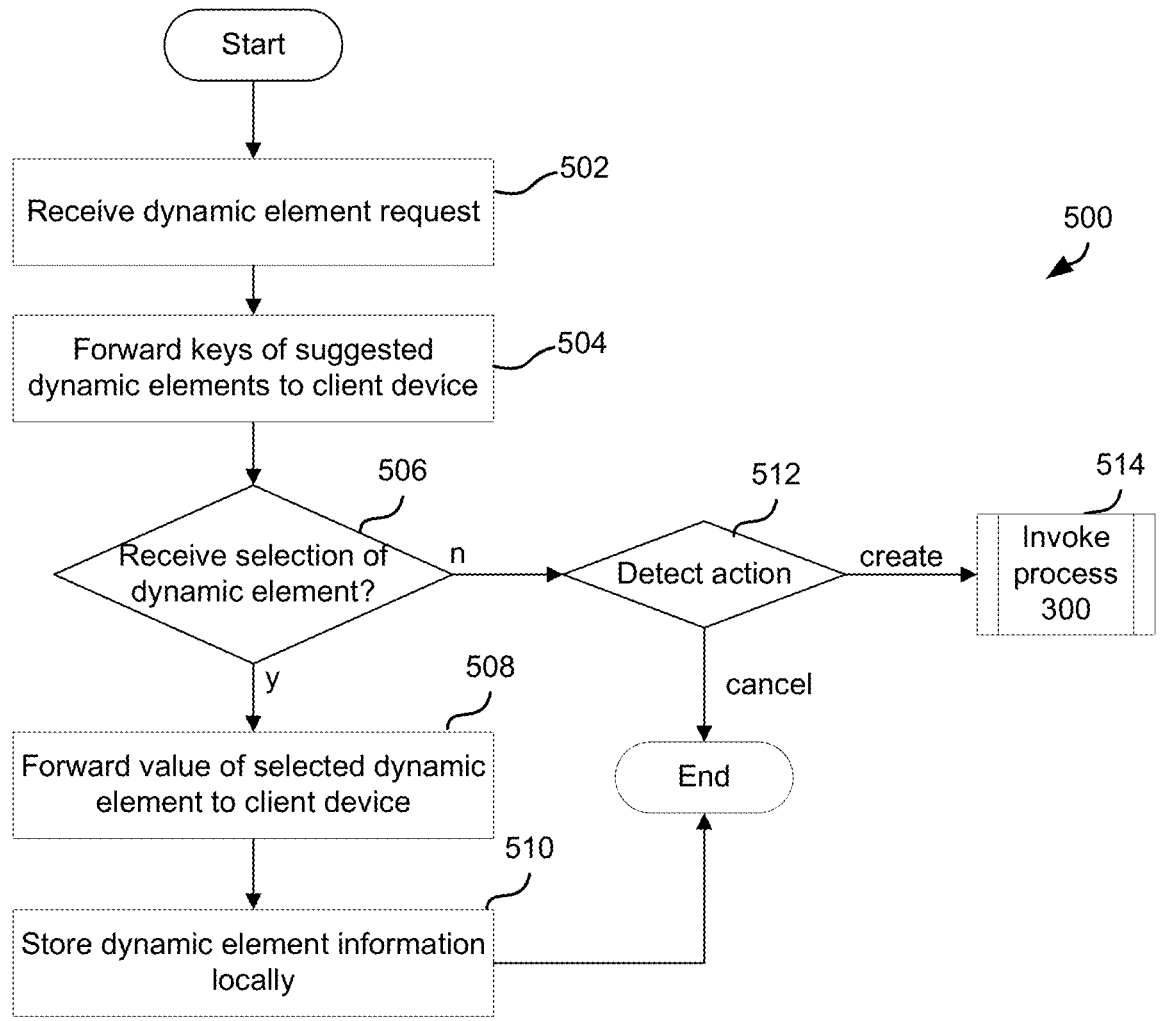
FIG. 5 is a flowchart illustrating a method for inserting a dynamic element inline according to some embodiments of the present disclosure.

FIG. 5 illustrates an exemplary method 500 for inserting a dynamic element in content on any application hosted by product platforms 104. The dynamic element may be inserted into content via a client application, such as client application 120 and preferably when a user is editing content in the client application via a rich content editor, such as content editor 124.

Method 500 begins at step 502, where a request for inserting a dynamic element is received at the DEMS 102. This may happen in a number of different ways. In certain embodiments, the client application 120 forwards a request to the DEMS (via the corresponding product platform 104) to invoke dynamic element insertion when an identification character is detected in the content editor 124. In one example, a user may be in the middle of creating content via the content editor 124 and may insert a special character or string of characters which may be the same as the special character for invoking the dynamic element creation process or may be different in the content editor 124. The client application 120 recognizes this character or string of characters as being associated with a dynamic element creation process. Consequently, it generates an insertion request and forward this to the product platform 104, e.g., along with the client ID, and the product platform forwards this request to the DEMS, e.g., along with the product platform ID. In another example, the content editor 124 may include a graphical interactive element, such as an icon or button representing a dynamic element, which may be activated to start the dynamic element insertion process.

At step 504, the DEMS 102 forwards a list of one or more suggested dynamic elements to the requesting client device 108 via its corresponding product platform 104. In order to do this, the DEMS 102 first identifies the list of dynamic elements it wishes to send to the client device 108. Various techniques may be utilized to make this identification.

In one case, if no text is entered after the dynamic element insertion request is detected, the DEMS 102 may generate a list of suggested dynamic elements based on a predetermined parameter. Example parameters may include most recent dynamic elements used by the user based on the user IDs and dynamic element ID in service requests data structure, most recent dynamic elements used by the user's team or organization based on the team ID and dynamic element ID in service requests data structure, most recently added dynamic elements based on dynamic element IDs in dynamic element data structure, most popular dynamic elements based on count of dynamic element IDs in service requests data structure, and so on. One or more relevancy ranking algorithms may be used to rank the dynamic elements based on a predetermined parameter.

FIG. 6 illustrates an example user interface that displays a list of suggested dynamic elements. In this example, the DEMS 102 has retrieved a list of most recently used dynamic elements for display on the client device 108.

On the other hand, if text is entered after the request for dynamic element insertion is detected, the DEMS 102 may be configured to suggest dynamic elements based on the entered text. For example, the client application 120 may forward the entered text to the DEMS 102 as and when it is detected. The DEMS 102 in turn may be configured to compare the received text with its dictionary of key values to identify one or more dynamic elements that match the received text. In certain embodiments, the DEMS 102 is configured to forward keys for identified dynamic elements to the client application 120 device on a continuous basis as text is received.

For example, if the DEMS 102 first receives the letters "st" it may compare these letters with the key names in the dictionary and identify a list of dynamic elements matching the letters, "st". If the DEMS 102 then receives the letters "oc", the DEMS 102 may conduct a further search in the list of identified dynamic elements to identify dynamic elements that match the letters, "stoc". This iterative searching and refining of identified dynamic elements continues until no more new text is entered by the user and received by the DEMS 102.

It will be appreciated that this is just one technique for generating suggestions and various other techniques can be employed in addition or alternatively without departing from the scope of the present disclosure.

Once one or more matching dynamic elements are identified, the DEMS 102 forwards the keys of the identified dynamic elements to the product platform 104A for display on the client device 108. Further, in some embodiments, the current value of the dynamic element may also be forwarded at this step. In order to forward this information, the DEMS 102 may generate a file, e.g., a JSON or YAML file, that includes at least the keys of the one or more identified dynamic elements and may additionally include the values, value type, category, permissions and refresh rates. These values are retrieved from the dynamic element data structure(s) maintained at the DEMS 102.

It will be appreciated that in case the keys are associated with dynamic elements belonging to a category, the DEMS 102 may be configured to forward dynamic element information related to multiple dynamic elements within the category to the client application 120.

Figure 7:
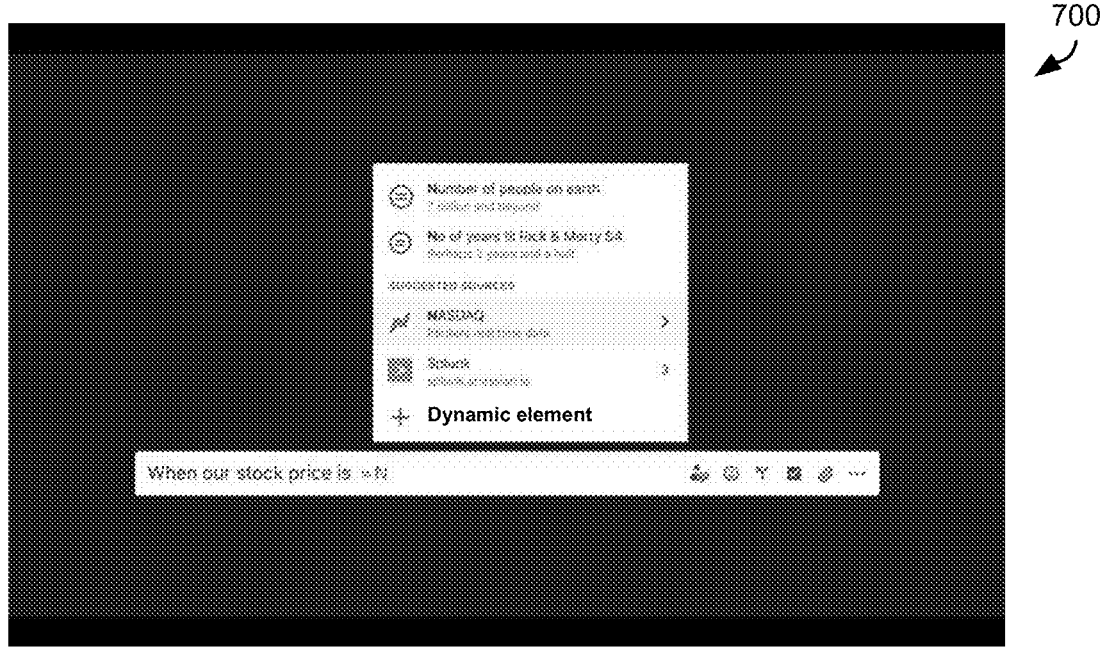
FIG. 7 illustrates a user interface depicting recommended dynamic elements according to some embodiments of the present disclosure.

FIG. 7 illustrates an example user interface 700 rendered at the client device 108 for displaying a list of identified keys. In this example, the content editor 124 includes the text "when our stock price is =N". Based on the text and specifically, the letter N, the DEMS 102 has identified four dynamic elements having keys: "Number of people on earth", "No of years til Rick & Morty S4", "Nasdaq" and "Splunk". In this example, "Nasdaq" and "Splunk" are categories or sources that include more than one nested dynamic elements and therefore the user interface 700 displays the category along with an option to drill down into the category to select a suitable dynamic element. Further, in the illustrated example, the rendered user interface 700 displays the current values associated with the non-nested dynamic elements. In other embodiments, the user interface 700 may simply display the keys without the associated values.

Returning to FIG. 5, at step 506 the client application 120 determines whether a dynamic element is selected from the list of suggested dynamic elements displayed at the client device 108 in the previous step. If it is determined that a dynamic element is selected, the method proceeds to step 508 where the client application 108 is configured to replace the identification character, if present, and any text displayed after the identification character in the content editor with the value associated with the selected dynamic element.

Figure 8:
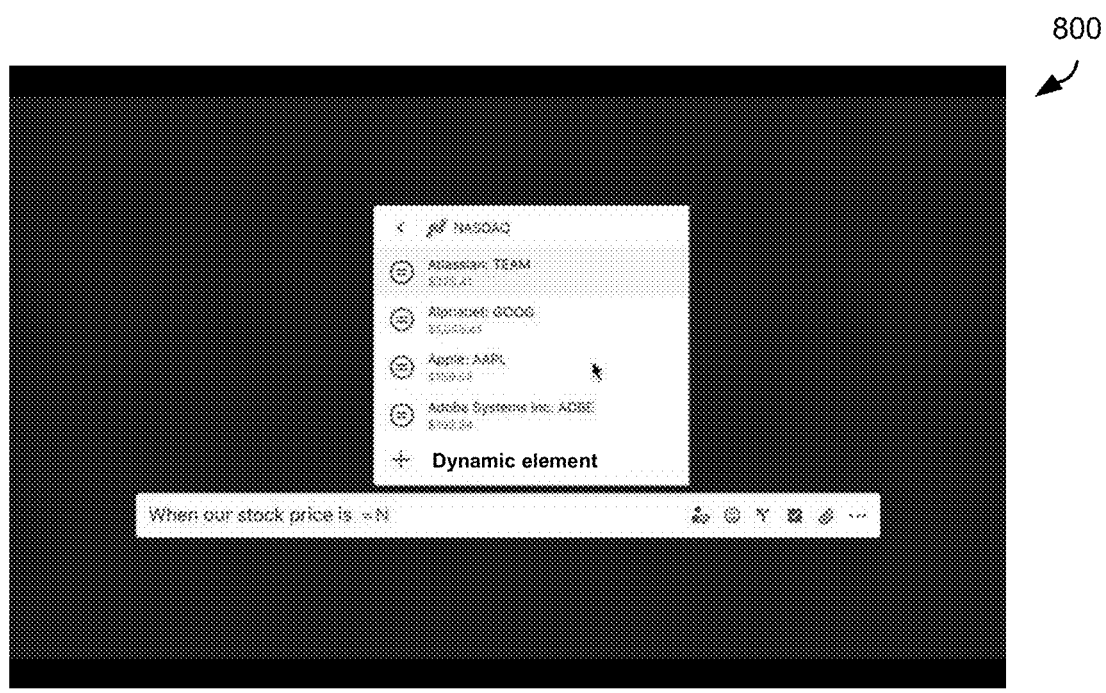
FIG. 8 illustrates a user interface depicting nested dynamic elements according to some embodiments of the present disclosure.
Figure 9:
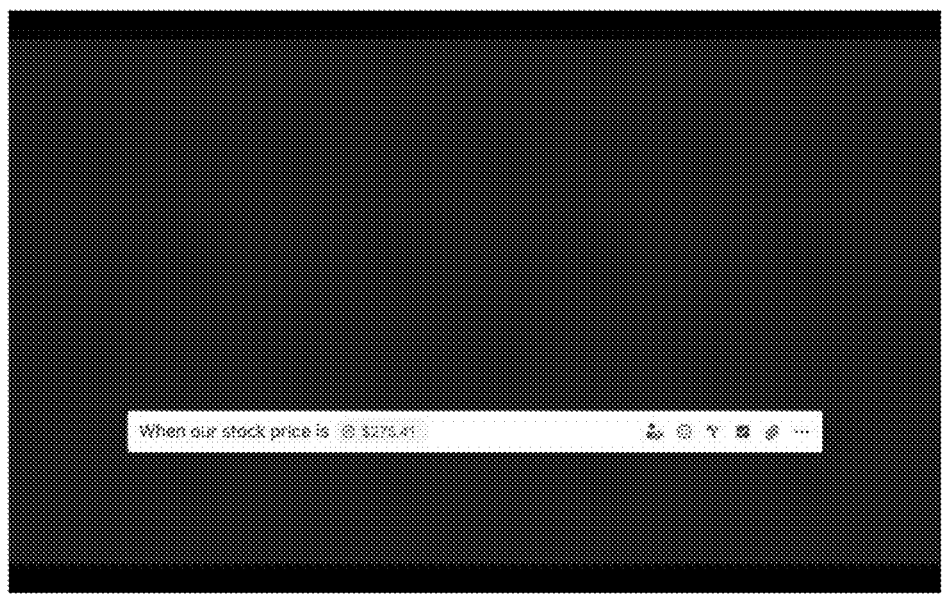
FIG. 9 illustrates a content editor user interface with a dynamic element inserted inline according to some embodiments of the present disclosure.

FIGS. 8 and 9 illustrate the user interface 800 and content editor user interface 900 when a particular dynamic element is selected. In particular, FIG. 8 illustrates the user interface 800 when the category "Nasdaq" from FIG. 7 is selected. As illustrated, the user interface 800 displays the nested dynamic elements available in the category "Nasdaq". In this example, this includes the dynamic elements "Atlassian: team", "Alphabet: GOOG", "Apple: APPL", and "Adobe Systems Inc. ADBE". If a large number of dynamic elements are present in a particular category, the user interface 800 may be configured to allow the user to scroll through the list of dynamic elements. FIG. 9 illustrates the content editor user interface 900 once the "Atlassian: Team" dynamic element is selected and the corresponding value is rendered in the content editor 124.

In case the DEMS 102 forwards the current value for the identified dynamic elements to the client application 120 at step 504, the client application 120 may be configured to retrieve the value from the received file and render it in the content editor 124. In case the file only includes the key for the dynamic elements, this step, i.e., step 508, includes the further process steps of returning an identifier of the selected dynamic element to the DEMS 102, the DEMS identifying the corresponding dynamic element based on the identifier, retrieving the current value for the dynamic element either directly from the data source or its own cache and forwarding this along with value type, permissions, and refresh rates to the client application 120. This information may be forwarded in the form of a dynamic element descriptor, similar to the descriptor generated when the dynamic element is created, see Table B. Alternatively, the descriptor may simply include the dynamic element ID and current value.

In certain embodiments, when a particular dynamic element is selected at step 506, it may be customized for that particular instance. As described previously, customization may include editing the permissions associated with the dynamic element and/or updating the refresh rate of the dynamic element if it is for a dynamic data value. Further, an option may be accorded for freezing the value of the dynamic element to the current value. Accordingly, once a dynamic element is selected at step 506, the client application 120 may optionally render a dynamic element customization interface.

Figure 10:
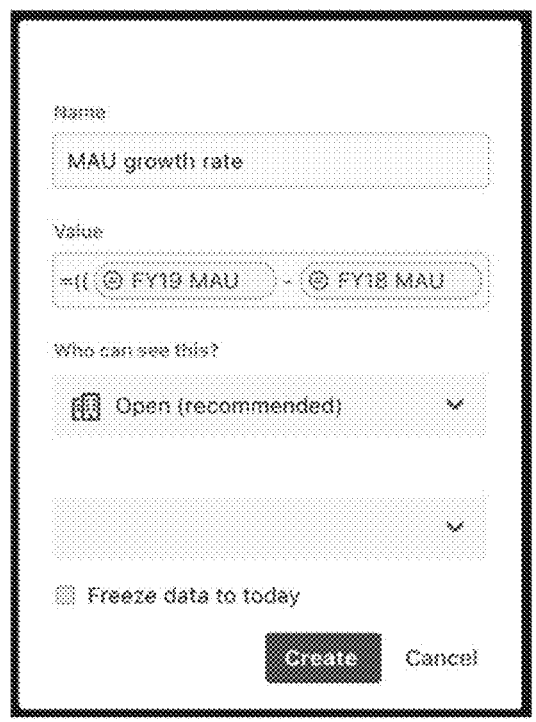
FIG. 10 illustrates a user interface for customizing a dynamic element according to some embodiments of the present disclosure.

FIG. 10 illustrates an example user interface 1000. As depicted in this example, the user operating on the client device 108 may be allowed to alter the permissions depending of course on the user's own permissions, change the refresh rate i.e., the rate at which the dynamic element is refreshed for live content, and/or freeze the value of the dynamic element to the current value.

Finally, at step 510, information corresponding to the dynamic element is stored locally. The information stored locally may depend on local customization status. If a dynamic element is not customized, the client application 120 and/or product platform 104 may be configured to store the dynamic element identifier. Alternatively, if the dynamic element is customized, the client application 120 and/or the product platform 104 may be configured to store the local customization information such as local refresh rate, local permissions, and/or local value if the value is frozen or amended locally, or the date/time at which the value is frozen.

Table C illustrates locally stored information for a customized dynamic element in the form of a local record.

TABLE C local dynamic element record

- Dynamic element:
  - id: 1
  - options:
    - poll:
      - status: true
      - interval: 5000
    - freeze:
      - status: true
      - time: 2018-03-16T05:35:01+00:00

In this example local record the following information is stored:

Unique ID of the dynamic element

Polling status indicating whether a local refresh rate is specified or not,

Polling Interval specifying the required local refresh rate (i.e., every 5000 milliseconds).

Freeze status indicating whether the value of the local instance is frozen or not, and Freeze time indicating the time at which the value of the dynamic element is frozen.

When stored, the local dynamic element record may be linked to other information associated with that particular page, e.g., the page content or page metadata.

The information described above is persistently stored in the client application 120 and/or product platform 104 even after that particular instance has been closed on the client application 120. In addition to this persistent information, the client application 120 may also temporarily store the refresh rates for dynamic elements of the dynamic data type. This information is utilized by the client application 120 to refresh the value of the dynamic element while that instance is still active based obviously on the specified refresh rate. When the page or application is closed, this temporary information may be deleted.

Further, at step 506 if a determination is made that the user has not selected any of the displayed keys, the method proceeds to step 512 where a determination is made to check if the user has performed any other function. The client application 120 may be configured to perform this step.

There may be a number of reasons why a user may not select a particular dynamic element from the list of displayed elements. For example, the displayed list may not include the dynamic element the user is interested in and the user may wish to search for alternative dynamic elements. Alternatively, the user may decide that he/she does not wish to insert a dynamic element at this time. In still other cases, the user may decide that the DEMS does not include the dynamic element the user is interested in and the user may wish to create a new dynamic element at this stage.

If at step 512 a determination is made that a request for creating a new dynamic element is received, the method proceeds to step 514 where method 300 is invoked.

On the other hand, if at step 512 a determination is made that the user has simply cancelled the dynamic element insertion process, e.g., by closing the user interface displaying the list of dynamic elements or deleting the identification character, the method 500 ends.

As depicted in FIGS. 6 and 7, the user interface that displays the list of retrieved dynamic elements may also provide an option to create a new dynamic element. Accordingly, method 500 may be interrupted at any stage after the list of suggested dynamic elements is presented to the client application 120 if the dynamic element creation method 300 is invoked.

4.3 Loading Content with Dynamic Elements

Figure 11:
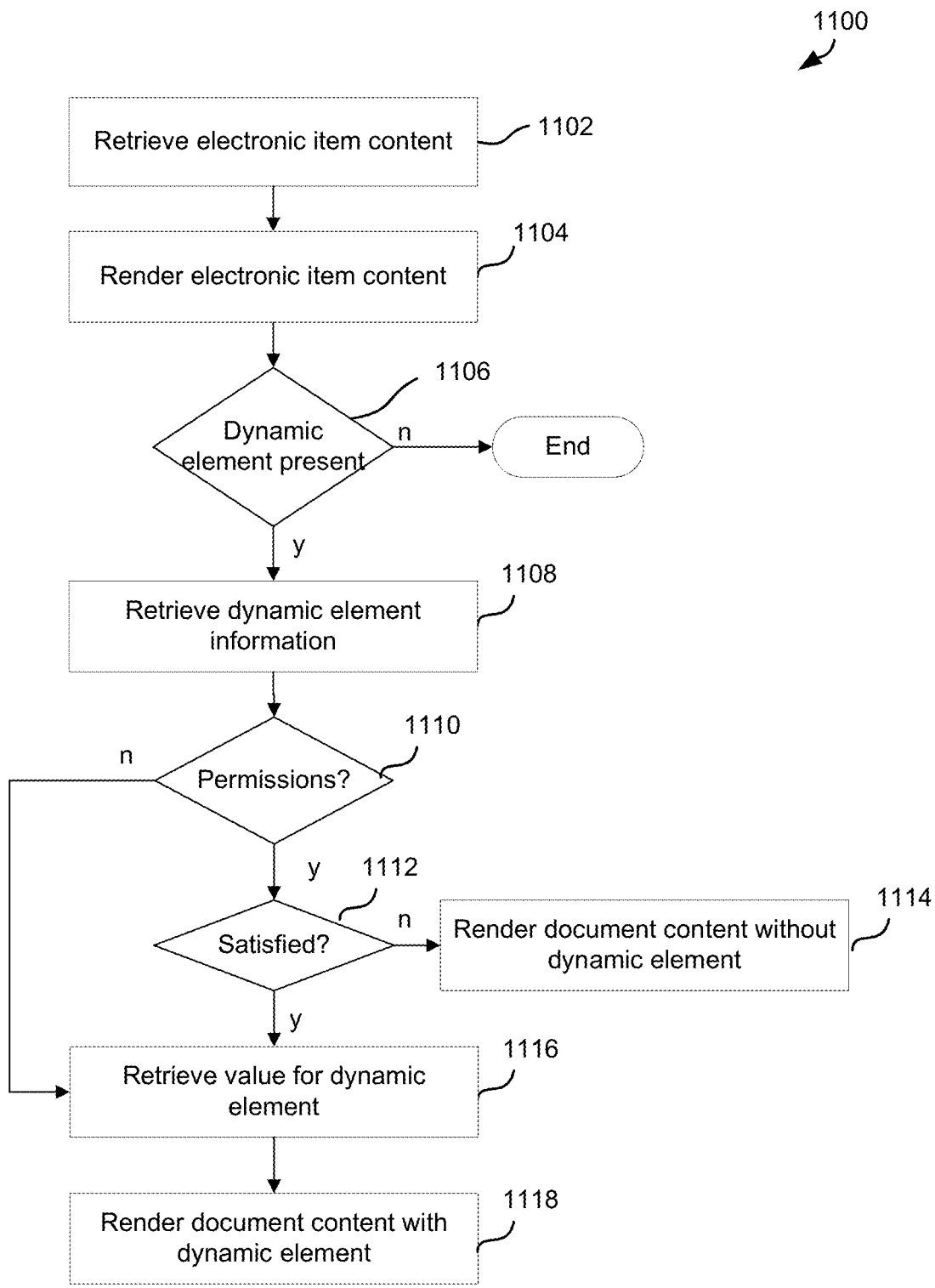
FIG. 11 is a flowchart illustrating a method for loading a document including a dynamic element according to some aspects of the present disclosure.

FIG. 11 illustrates an exemplary method 1100 for rendering an electronic content item in a particular client application 120. As used herein, the term electronic content item refers to any type of medium that includes content. Examples of documents include chat windows, webpages, blogs, websites, dashboards, a word processor document, etc.

The method 1100 begins at step 1102, where the client application 120 retrieves content for the particular electronic content item. Depending on the type of electronic item, the content may be retrieved from various different sources. For example, content for a word processor document may be retrieved from a local database at the client device 108 or from storage on the local intranet. Similarly, content for a webpage, blog, chat window, post may be retrieved from the corresponding product platform 104.

At step 1104, the client application 120 renders the content. If the electronic item includes one or more dynamic elements, the content around dynamic elements may be rendered and placeholders may be displayed in the positions where the dynamic elements are supposed to be displayed.

Next, at step 1106 the client application 120 determines whether any dynamic elements are present in the electronic content item. In certain embodiments, this determination may be made based on a lookup for local dynamic element descriptors in the client application or product platform database. If it is determined that no dynamic elements are present in the electronic content item, the method 1100 ends.

Alternatively, if at step 1106 a determination is made that a dynamic element is present in the page content, the method proceeds to step 1108, where the client application 120 is configured to retrieve information about the dynamic element. As described previously, some of this information may be persistently stored in the client application/product platform, whereas other information may be stored only at the DEMS 102 or data sources 106. Accordingly, depending on where the information associated with the dynamic element is stored, the client application 120 is configured to retrieve this information—e.g., in the form of a local descriptor retrieved from the product platform 104 or client application memory and/or in the form of a dynamic element descriptor received from the DEMS 102.

At step 1110, a determination is made whether there are any permissions associated with the dynamic element. This can be done, for example, by analyzing the permissions field of a dynamic element descriptor. If there are limited permissions associated with the dynamic element, the method proceeds to step 1112, where a determination is made whether the current user account associated with the client application at the client device 108 is permitted to access the dynamic element.

If a determination is made that the user ID is not permitted to access the dynamic element at this step, the method 1100 proceeds to step 1114 where the client application is configured to render the document content without displaying the dynamic element. In some examples, an error placeholder e.g., "access denied" may be displayed in place of the dynamic element.

Alternatively at step 1112, if it is determined that the user is allowed to access the dynamic element, the client application 120 is configured to retrieve the value for the dynamic element at step 1116. In certain embodiments, to do this, the client application 120 forwards the dynamic element identifier to the DEMS 102 and the DEMS in turn returns the latest/current value associated with that dynamic element identifier to the requesting client application 120. This may be done for dynamic elements that are not frozen to a particular value. For dynamic elements with frozen values, the client application 120 is configured to forward the dynamic element identifier along with the freeze time of the dynamic element to the DEMS 102. The DEMS 102 in turn returns the value of the dynamic element that corresponds to the value at the freezing time.

Finally, the method proceeds to step 1118 where the document content along with the value of the dynamic element is rendered on the display of the client device 108.

4.4 Asynchronous Refreshing

As described previously, the dynamic element can be refreshed asynchronously, i.e., without reloading the entire page, based on a specified refresh rate. To do this, the client application 120 may maintain a timer based on the stored dynamic element refresh rate. Once the timer runs out, the client application 120 may be configured to request the DEMS 102 to provide a new value, for example by forwarding the dynamic element identifier to the DEMS 102 along with a client application identifier and a request for an updated value. The DEMS 102 in turn may look-up the value for the dynamic element in its local cache or directly from a data source and forward the value back to the requesting client application.

In case a local cache is maintained at the DEMS 102, the DEMS 102 may be configured to refresh the value for each dynamic element in the local cache based on the fastest refresh rate requested for that particular dynamic element. For example, if at creation, the refresh rate for a dynamic element is specified as 10000 milliseconds, the DEMS 102 may be configured to retrieve/check the latest value of the dynamic element every 10000 milliseconds and refresh the local cache accordingly. Subsequently, if a user specifies a refresh rate of say 5000 milliseconds when inserting this dynamic element in a particular electronic content item, the DEMS 102 may be configured to retrieve/check the latest value for that dynamic element every 5000 milliseconds and store the retrieved value in the local cache.

To implement this, when the refresh rate for a dynamic element is locally customized, the client application 120 may be configured to forward the local refresh rate along with the dynamic element ID to the DEMS 102. If the local refresh rate is faster than the refresh rate stored against the dynamic element record, the DEMS 102 may be configured to update the refresh rate with this faster rate.

4.5 DEM User Interface

In addition to creating, inserting and refreshing dynamic elements the presently disclosed systems and methods allow users to view and manage dynamic elements. This may be done via the DEM application on the client device 108, which may render a user interface to display one or more dynamic elements that a user account has created or has permissions to edit.

A user may sign-in to the DEM application 122. The client application 122 may subsequently forward user account information to the DEM 102. Using the user account information, the DEMS 102 may retrieve a list of dynamic element that the user account has created by performing a lookup with the user account ID in the dynamic element data structure. This information may be displayed in the rendered UI.

If the user selects any one of the dynamic elements displayed in the UI, more information about the dynamic element may be rendered. This may include current information such as refresh rates, permissions, type, category, date created, etc. It may also include statistical information such as number of times the dynamic element has been used, date last inserted, list of teams/users accounts using that particular dynamic element, etc. The information required to render the additional information may be retrieved from the DEMS 102 once the dynamic element is selected.

In addition to displaying dynamic element information, the user interface may also allow a user account to manage the dynamic elements for which they have editing permissions. For example, a user may be able to change the value of a dynamic element, amend the permissions for a particular dynamic element, update the refresh rate, add or remove a dynamic element to or from a particular category, archive or delete any dynamic elements of the static types that are not being used, delete any dynamic elements of the dynamic type that have never been used, etc.

4.6 Suggesting Dynamic Elements

As described previously with reference to FIG. 5, the DEMS 102 in certain embodiments suggests dynamic elements to the client application 120 in response to receiving a request for inserting dynamic elements in line with electronic content. One technique for doing this is previously described—i.e., comparing any text entered after the request with a dictionary of key names. However, it will be appreciated that multiple other techniques may be employed in addition or alternatively.

For example, in certain cases, the DEMS 102 may be configured to predict one or more dynamic elements the user may be interested in inserting based on the text entered in the content editor before the request for dynamic element insertion is detected. In this case, any text entered in the content editor 124 is forwarded to the DEMS 102 for analysis and the DEMS utilizes one or more text or context analyses technique to identify related dynamic elements. For example, the DEMS 102 may analyze the key names in the dictionary to identify one or more root words and/or synonyms. These identified root words and synonyms may also be stored in the dictionary in associated with the corresponding dynamic element identifier. Subsequently, when text is received from the client application 120, the DEMS 102 may be configured to analyze the text to identify one or more nouns. It may then compare these nouns with the key names, root words, and synonyms stored in the dictionary. It will be appreciated that this is just one example technique for identifying dynamic elements based on context and any other such technique may be employed to identify dynamic elements the user may be interested in based on text entered in the content editor.

Furthermore, it will be appreciated that the DEMS 102 may be configured to only suggest dynamic elements that the user is permitted to use. To this end, the client application may forward the user account information to the DEMS 102 along with the request for inserting the dynamic element. The DEMS 102 in turn may be configured to compare the received user account information with the permissions of the identified dynamic elements to determine whether the user account is allowed to access the dynamic element. If the user account is not permitted to access one or more dynamic elements, these may be removed from the list of suggested dynamic elements before the list is forwarded to the client application for display.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" and variations of those terms, such as "including", "includes", "comprising", "comprises", "comprised" and the like are intended to be inclusive and are not intended to exclude further features, components, integers or steps. Further, the terms "process" and "method" are interchangeably used.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

5. Hardware Overview

The operations/techniques described herein are implemented by one or more special-purpose computing systems or devices. For example, in environment 100: the DEMS 102 may be provided by one or more computer systems; each product platform 104 may be provided by one or more computer systems; each client device 108 is a computer system; and each of the data sources 106 are provided by one or more computing systems.

The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired and/or program logic to implement relevant operations.

Figure 2:
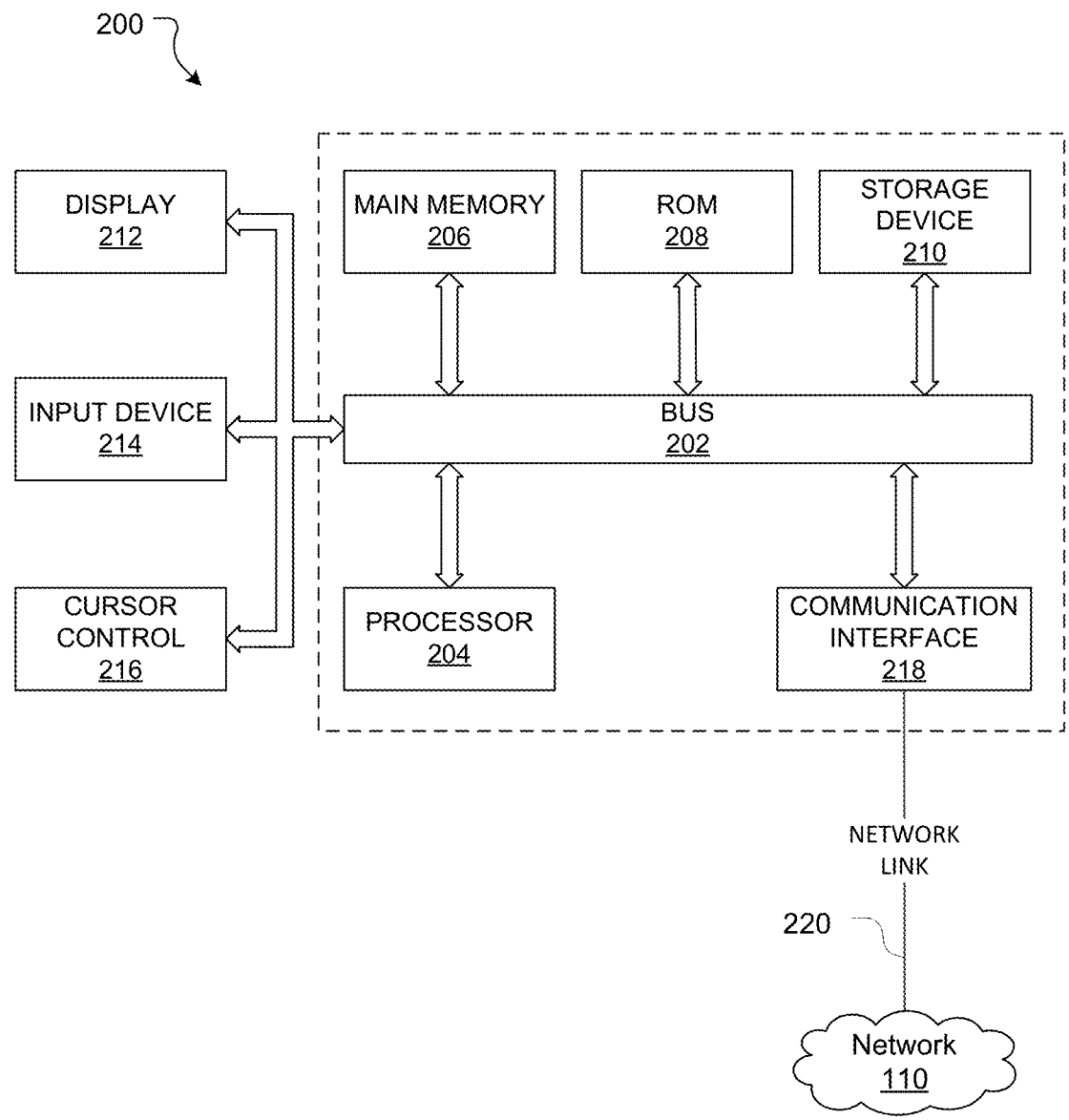
FIG. 2 is a block diagram of a computing system with which various embodiments of the present disclosure may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general-purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions. If the computer system 200 is part of the DEMS 102, the storage device 210 may store database 112 or the cache.

In case the computer system 200 is the client device 108, it may be coupled via bus 202 to one more output devices such as a display 212 for displaying information to a computer user. Display 212 may, for example, be a cathode ray tube (CRT), a liquid crystal display (LCD), a light emitting diode (LED display), or a touch screen display. An input device 214, including alphanumeric and other keys, may be coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that permits the device to specify positions in a plane. Additional and/or alternative input devices are possible, for example touch screen displays.

According to one embodiment, the methods disclosed herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 2504 retrieves and executes the instructions. The instructions received by main memory 206 may optionally be stored on storage device 210 either before or after execution by processor 2504.

Computer system 200 also includes a communication interface 218 coupled to bus 202. Communication interface 218 provides a two-way data communication coupling to a network link 220 that is connected to network 108. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks 108 to other computing systems. For example, if the computing system 200 is part of the DEMS 102, the network link 220 may provide a connection through network 110 to client devices 108, data sources 106 or product platforms 104.

Computer system 200 can send messages and receive data, including program code, through the network(s), network link 220 and communication interface 218. In the DEMS example, the management server 114 may receive dynamic element requests from the product platform 106A through the network 108 and communication interface 218.

The processor 204 of the service provider may execute the received access identifier as it is received, and/or store it in storage device 210, or other non-volatile storage for later execution.

What is claimed is:

1. A method for inserting a dynamic element into electronic content using a client application, the method comprising:

receiving a dynamic element creation request from a first client application being used to generate a first content item at a first client device;

in response to receiving the dynamic element creation request from the first client application, launching a dynamic element creation interface comprising a first input field for creating a key used to identify the dynamic element and a second input field for identifying a dynamic data source for retrieving a value for the dynamic element;

receiving, from the first client device, a first input at the first input field and a second input at the second input field;

in response to receiving the first and second inputs:
creating the dynamic element;
storing the dynamic element at a dynamic element management system; and
replacing the dynamic element creation request in the first content item with the value retrieved from the dynamic data source;

receiving, at the dynamic element management system, a dynamic element insertion request from a second client application being used to generate a second content item at of a second client device;

in response to receiving the dynamic element insertion request from the second client application, identifying at the dynamic element management system, one or more keys corresponding to one or more suggested dynamic elements;

causing the second client application to display one the one or more keys, the one or more keys including the key associated with the dynamic element;

receiving, at the dynamic element management system, indication of selection of the key corresponding to the dynamic element;

in response to receiving the indication of the selection of the key, causing the second client device to replace the dynamic element insertion request in the second content item with the value retrieved from the dynamic data source;

subsequent to replacing the dynamic element insertion request with the value, receiving from the dynamic data source an updated value for the dynamic element; and in response to receiving the updated value, causing the value in the first content item and the second content item to be updated with the updated value.

2. The method of claim 1, further comprising:

retrieving by the dynamic element management system, the value of the dynamic element from the dynamic data source and storing the retrieved value of the dynamic element corresponding to the selected key in in a database of the dynamic element management system.

3. The method of claim 2, further comprising:

retrieving a current value of the dynamic element from the dynamic data source at a predetermined refresh rate; and updating the value in the database with the retrieved current value.

4. The method of claim 3, further comprising:

receiving a request from the first client application for the current value of the dynamic element; and retrieving and forwarding the current value of the dynamic element from the database.

5. The method of claim 1, wherein the dynamic element management system is configured to communicate with the client application via a product platform corresponding to the client application.

6. The method of claim 1, wherein identifying the one or more keys corresponding to the one or more suggested dynamic elements further comprises:

receiving text from the first client application; and comparing the text with a dictionary of key names stored in a database of the dynamic element management system.

7. The method of claim 1, wherein:

the second client application is associated with a first software product executing on the second client device; and the method further comprises:

receiving, at the dynamic element management system, a dynamic element insertion request from a third client application, the third client application associated with a second software product executing on the second client device, wherein the first software product is different to the second software product.

8. A method comprising:

receiving, at a dynamic element management system, a dynamic element creation request from a first client application being used to generate a first content item at a first client device;

in response to receiving the dynamic element creation request from the first client application:

cause creation of a dynamic element comprising a value retrieved from a dynamic data source and a dynamic element identifier; and cause the first client device to replace the dynamic element creation request in the first content item with the value retrieved from the dynamic data source;

receiving, at the dynamic element management system a request for loading the dynamic element at a first second client application of a second client device, the request including the dynamic element identifier associated with the dynamic element and initiated by a special symbol being inserted into a second content item at the second client application;

retrieving the value for the dynamic element from the dynamic data source based on the dynamic element identifier;

in response to retrieving the value for the dynamic element:

sending the value to the second client device; and causing the second client device to replace the special symbol in the second content item with the value retrieved from the dynamic data source;

causing the second client device to render the value of the dynamic element on a display of the second client device;

subsequent to the second client device rendering the value of the dynamic element, receiving from the dynamic data source an updated value for the dynamic element; and in response to receiving the updated value causing the value in the first content item and the value in the second content item to be changed using the updated value.

9. The method of claim 8, wherein the value corresponding to the dynamic element is received in a dynamic element descriptor, the dynamic element descriptor further comprising information specifying a refresh rate for refreshing the value corresponding to the dynamic element identifier, the method further comprising temporarily storing the refresh rate at the first client application.

10. The method of claim 9, further comprising:

setting a timer at the first client application based on the refresh rate; and transmitting a request for a current value corresponding to the dynamic element identifier to the dynamic element management system upon completion of the timer.

11. The method of claim 8, further comprising:

forwarding a user account identifier to the dynamic element management system along with the dynamic element identifier; and receiving the value corresponding to the dynamic element identifier from the dynamic element management system only if a user account corresponding to the user account identifier is permitted to access the user specified dynamic element.

12. A dynamic element management system, comprising:

a database for storing multiple dynamic elements, the multiple dynamic elements including a dynamic element created in response to:

receiving a dynamic element creation request from a first application executing on a first client device;

launching a dynamic element creation interface comprising a first input field for creating a key used to identify the dynamic element and a second input field for identifying a dynamic data source for retrieving a value for the dynamic element;

receiving, from the first client device, a first input at the first input field and a second input at the second input field;

in response to receiving the first and second inputs:
  creating the dynamic element;
    storing the dynamic element at the dynamic element management system; and
    replacing the dynamic element creation request in the first content item with the value retrieved from the dynamic data source;
  one or more processors; and
  one or more non-transitory computer-readable storage media storing sequences of instructions which, when executed by the one or more processors, cause the one or more processors to:
    receive a dynamic element insertion request from a second client application being used to generate a second content item executing on a second client device;
    in response to receiving the dynamic element insertion request from the second client application, identify at the dynamic element management system, one or more keys corresponding to one or more suggested dynamic elements;
    causing the second client application to display the one or more keys, the one or more keys including the key associated with the dynamic element;
    receive an indication of selection of the key corresponding to the dynamic element;
    in response to receiving the indication of the selection of the key, causing the second client device to replace the dynamic element insertion request in a second content item with the value retrieved from the dynamic data source;
    subsequent to replacing the dynamic element insertion request with the value, receive from the dynamic data source an updated value for the dynamic element; and
    in response to receiving the updated value, causing the value in the first content item and the second content item to be updated with the updated value.

13. The system of claim 12, further comprising instructions, which when executed by the one or more processors, cause the one or more processors to:
  retrieve the value of the dynamic element from a source external to the dynamic element management system and store the retrieved value in the database.

14. The system of claim 13, further comprising instructions, which when executed by the one or more processors, cause the one or more processors to:
  retrieve a current value of the user specified dynamic element from the external source at a predetermined refresh rate; and
  update the value in the database with the retrieved current value.

15. The system of claim 14, further comprising instructions, which when executed by the one or more processors, cause the one or more processors to:
  receive a request from the second client application for the current value of the dynamic element; and
  retrieve the current value of the dynamic element from the database; and
  forward the current value of the dynamic element to the second client application.

16. The system of claim 12 configured to communicate with the second client application via a first product platform corresponding to the second client application.

17. The system of claim 12, wherein identifying the one or more keys corresponding to the one or more suggested dynamic elements further comprises:

receiving text from the second client application; and
comparing the text with a dictionary of key names stored at the dynamic element management system.

18. The system of claim 12, wherein:
  the second client application is associated with a first software product executing on the second client device; and
  the method further comprises instructions, which when executed by the one or more processors, cause the one or more processors to:
    receive a dynamic element insertion request from a third client application, the third client application associated with a second software product, executing on the second client device, wherein the first software product is different to the second software product.

19. The system of claim 18, wherein the first and second software products are selected from a group comprising:
  Wikipedia product; issue tracking product, source code management product, instant messaging product, or collaboration product.

20. A system comprising:
one or more processors; and
one or more non-transitory computer-readable storage media storing sequences of instructions which, when executed by the one or more processors, cause the one or more processors to:
  receive, at a dynamic element management system, a dynamic element creation request from a first client application being used to generate a first content item at a first client device;
  in response to receiving the dynamic element creation request at the first content item:
    create a dynamic element comprising a value retrieved from a dynamic data source and a dynamic element identifier; and
    cause the first client device to replace the dynamic element creation request in the first content item with the value retrieved from the dynamic data source;
  receive a request for loading the dynamic element at a second client application executing on a second client device, the request generated by a special symbol referencing the dynamic element identifier being inserted into a second content item being generated at the second client application;
  retrieve the value for the dynamic element from the dynamic data source;
  in response to retrieving the value for the dynamic element:
    causing the special symbol in the second content item to be replaced with the value retrieved from the dynamic data source by the dynamic element management system; and
    causing the second client device to render the value in line with content on a display of the second client device.

21. The system of claim 20, wherein the value corresponding to the dynamic element identifier is received in a dynamic element descriptor, the dynamic element descriptor further comprising information specifying a refresh rate for refreshing the value of the dynamic element, the system further comprising instructions which, when executed by the one or more processors, cause the one or more processors to temporarily store the refresh rate at the system.

22. The system of claim 21, further comprising instructions which, when executed by the one or more processors, cause the one or more processors to:

set a timer based on the refresh rate; and transmit a request for a current value of the dynamic element to the dynamic element management system upon completion of the timer.

23. The system of claim 20, further comprising instructions which, when executed by the one or more processors, cause the one or more processors to:

forward a user account identifier to the dynamic element management system along with the dynamic element identifier; and receive the value corresponding to the dynamic element identifier from the dynamic element management system only if a user account corresponding to the user account identifier is permitted to access the dynamic element.

* * * * *